United States Patent [19]

Hawkins et al.

[11] Patent Number: 4,895,387
[45] Date of Patent: Jan. 23, 1990

[54] SEMI-SUBMERSIBLE TRAILER FOR TRANSPORTING BOATS

[76] Inventors: Avalon K. Hawkins, Rt. 1, Box 248; David Norcutt, Rt. 1 Logan Hill, both of Louisville, Tenn. 37777

[21] Appl. No.: 312,925
[22] Filed: Feb. 21, 1989
[51] Int. Cl.⁴ .............................................. B60P 3/10
[52] U.S. Cl. .................................................. 280/414.1
[58] Field of Search ..................................... 280/414.1

[56] References Cited

U.S. PATENT DOCUMENTS

| | | | |
|---|---|---|---|
| 3,098,674 | 7/1963 | White | 280/414.1 |
| 3,455,473 | 7/1969 | Parker | 214/84 |
| 3,595,598 | 7/1971 | Nuzum | 280/179 A |
| 3,951,433 | 4/1976 | Starkey | 280/414 R |
| 3,984,121 | 10/1976 | Dobosi | 280/414.1 |
| 4,626,162 | 12/1986 | Parisi | 280/414.1 |

Primary Examiner—Charles A. Marmor
Assistant Examiner—Donn McGiehan
Attorney, Agent, or Firm—Milton S. Gerstein; Marvin N. Benn

[57] ABSTRACT

A trailer for transporting boats is provided with an automatic centering structure having a pair of equal-length centering cables each having a first exterior end connected to a forward interior portion of the trailer frame, and a second interior end coupled to a snap-hook, which snap-hook is securable to a bow-eye of the boat being loaded onto the trailer. The centering cables position the bow of the boat along the longitudinal center of the trailer frame as the boat is driven onto the trailer under the boat's own power. Bunks or boards are also provided to aid in the centering procedure, for carrying loads, and for structural integrity.

18 Claims, 2 Drawing Sheets

4,895,387

SEMI-SUBMERSIBLE TRAILER FOR TRANSPORTING BOATS

BACKGROUND OF THE INVENTION

The present invention is directed to a semi-submersible trailer for carrying and transporting boats from and to a lake, or the like. Existing prior art, semi-submersible trailers generally comprise a main frame upon which the boat is supported, which main frame is provided with a forward, upwardly-extending, V-shaped section upon which the forward portion of the hull is supported. This forward, V-shaped, upwardly-sloping section of the frame is provided with an upstanding, padded V-shaped support for the forward vertical edge of the bow of the hull, which is commonly termed a "bow-stop." In operation, the boat is driven onto the semi-submersible trailer until the boat makes physical contact with the padded bow stop, at which point the boat is stopped. The power for causing the abutment of the bow against the bow-stop is provided by the engine of the boat itself, and entails considerable skill on the part of the driver of the boat. First, the boat must be driven onto the trailer proper, with continuous powering thereafter in order to cause the abutment of the bow against the bow-stop. Continual powering of the boat is required thereafter in order to finally align the bow against the bow-stop, so that a loop, or what is commonly termed a "bow-eye," is correctly positioned so as to receive a pivotal locking lever arm, commonly termed a "security bar," which secures the boat to the frame, which security bar is provided as part of the bow-stop unit itself, with the bottom of the security bar being pivotal below the padded bow-stop. This prior-art trailer and method of use suffers from considerable drawbacks. Hull damage is common, owing to the contact between the bow area of the hull and the bow-stop itself during positioning and centering. In the worst-case scenario, the padded bow-stop board may split open upon firm contact by the boat's hull, exposing the bolt heads which gouge the boat's hull. Normal wear and tear owing to abrasive contact is also inevitable, causing cosmetic damage to the bow of the hull. An additional drawback to the prior-art method and frame is the requirement of positioning the security bar's slot over the boat's bow-eye, which more often than not causes fingers to be pinched during such positioning, owing to the tight fit therebetween. The security bar has a 3-inch long slot on the upper portion thereof, in which the boat's bow-eye is received, which is an extremely tight fit and often leads to the catching of fingers during such procedure. A more considerable problem associated with this prior-art frame and method is the common occurrence of overdriving the boat while positioning it on the trailer. This occurs because of variable loading situations, in which very different amounts of load are positioned on the boat. Specifically, during the final stages of driving the boat onto the frame, when it is necessary to position the hull such that the bow-eye is in substantial alignment with the security bar, the boat may often move forward 2 or 3 feet during such maneuvering, which has, in the past, caused the rear propeller of the boat to strike against the rearmost cross member of the trailer frame, causing considerable damage to the propeller, sometimes the propeller shaft, and the cross member, all of which is costly. In the prior-art trailer frame, the security bar has substantially no lateral movement, only vertical pivotal movement, with the centering of the hull on the bow-stop being a tedious task, often leading to any of the problems mentioned above, all of which occurs because of the need to properly center the hull of the boat on the trailer frame.

The present invention is directed to an improved type of trailer frame and method of use, by which positioning of the boat on the trailer frame is considerably made easier and more facile, and which also overcomes all of the above-mentioned drawbacks.

SUMMARY OF THE INVENTION

Thus, the primary objective of the present invention is to provide an improved semi-submersible trailer frame for loading and carrying boats, which is substantially self-centering during the process of loading the boat onto the trailer frame, and which obviates the need for the final driving of the boat onto the trailer frame, which in the prior-art was termed "overdrive," thereby eliminating the potential for propeller damage and cosmetic hull damage, or more.

It is another objective of the present invention to provide an improved boat trailer frame and method of use thereof, which eliminates the need of a rigid bow-stop of the prior-art trailer frames, as well as the security bar associated therewith, thereby obviating the potential problem of pinching or catching fingers during the securing process. It is yet another objective of the present invention to provide such an improved loading system that still utilizes the self-powering drive of the boat, but which entirely eliminates the need for fine-positioning the boat on the trailer frame, in that the present invention provides for automatic centering the boat on the trailer frame.

It is still another objective of the present invention to provide a boat-loading system, which is easier to achieve, execute and safer to use.

Toward these and other ends, the improved semi-submersible boat trailer frame of the present invention is provided with a main carrying frame upon which the boat to be transported is supported, which trailer frame is provided with two main frame rails terminating in a conventional trailer hitch for securement to the rear bumper of a towing vehicle. The forward portion of the trailer frame is provided with a pair of walk boards or bunks, which are a pair of padded or carpeted boards, slightly spaced apart, upwardly-sloping and vertically angularly-positioned. The slight spacing between the boards allows for the reception therein of the longitudinal center of the boat's hull. The bunks or boards serve to guide the boat during loading and unloading, and also serve to physically support the boat during transport. Operatively associated with these carpeted walk boards or bunks is the automatic centering mechanism of the present invention, which comprises a pair of cables, each cable being fixedly attached to a respective inner lower side wall portion of the trailer frame, and with each of the pair of cables also defining an inner end fixedly connected to a snap hook, which snap hook is used for securement to the bow-eye of the hull portion of the boat. Each cable is of the same length, and is immovable with respect to its connection with the snap hook, at the inward ends thereof. The cables serve to automatically center the boat hull during loading the boat on the trailer frame, such automatic centering being achieved by firstly driving the boat onto the trailer frame until the snap hook is manually engaged into the bow-eye, thereby coupling the bow-eye to the pair of cables. Secondly, the boat is driven farther onto the trailer frame, such that the bow of the boat is driven onto and along the walk boards, with the pair of cables automatically centering the bow of the boat during forward movement thereof along the walk boards, owing to the triangular arrangement thereof, such centering being achieved via the connection between the snap hook and the bow-eye. The boat is driven along the trailer until the bow has reached its forwardmost position on the walk boards, which forwardmost position is that defined by the forwardmost positioning of the snap hook, which is defined by the lengths of the pair of cables, achieved in automatically centering the bow of the boat.

The cables automatically center the bow of the boat, since any lateral swerving or diversion of the boat's hull will cause forces to be created in the appropriate respective cable to return the bow to its center-position, defined at the snap hook's connection at the inner ends of the pair of cables. In essence, each of the cables automatically redirect the forces of the boat in its movement along a longitudinal center line of the trailer frame for proper centering, with all non-centering or lateral transverse forces created during the forward movement of the boat being taken up by a respective one of the cables, which in reaction thereto automatically centers the boat hull between the pair of walk boards. The combination of cables form a harness with the center point thereof being defined by the snap hook, which forms a positive stop to the boat's bow, thereby obviating the need for a separate bow-stop of prior-art trailers.

The improved trailer of the invention is also provided with additional guide bunks and support bunks for supporting the remainder of the boat's hull on the trailer.

BRIEF DESCRIPTION OF THE DRAWINGS

The invention will be more readily understood with reference to the accompanying drawings, wherein.

DETAILED DESCRIPTION OF THE INVENTION

Figure 1:
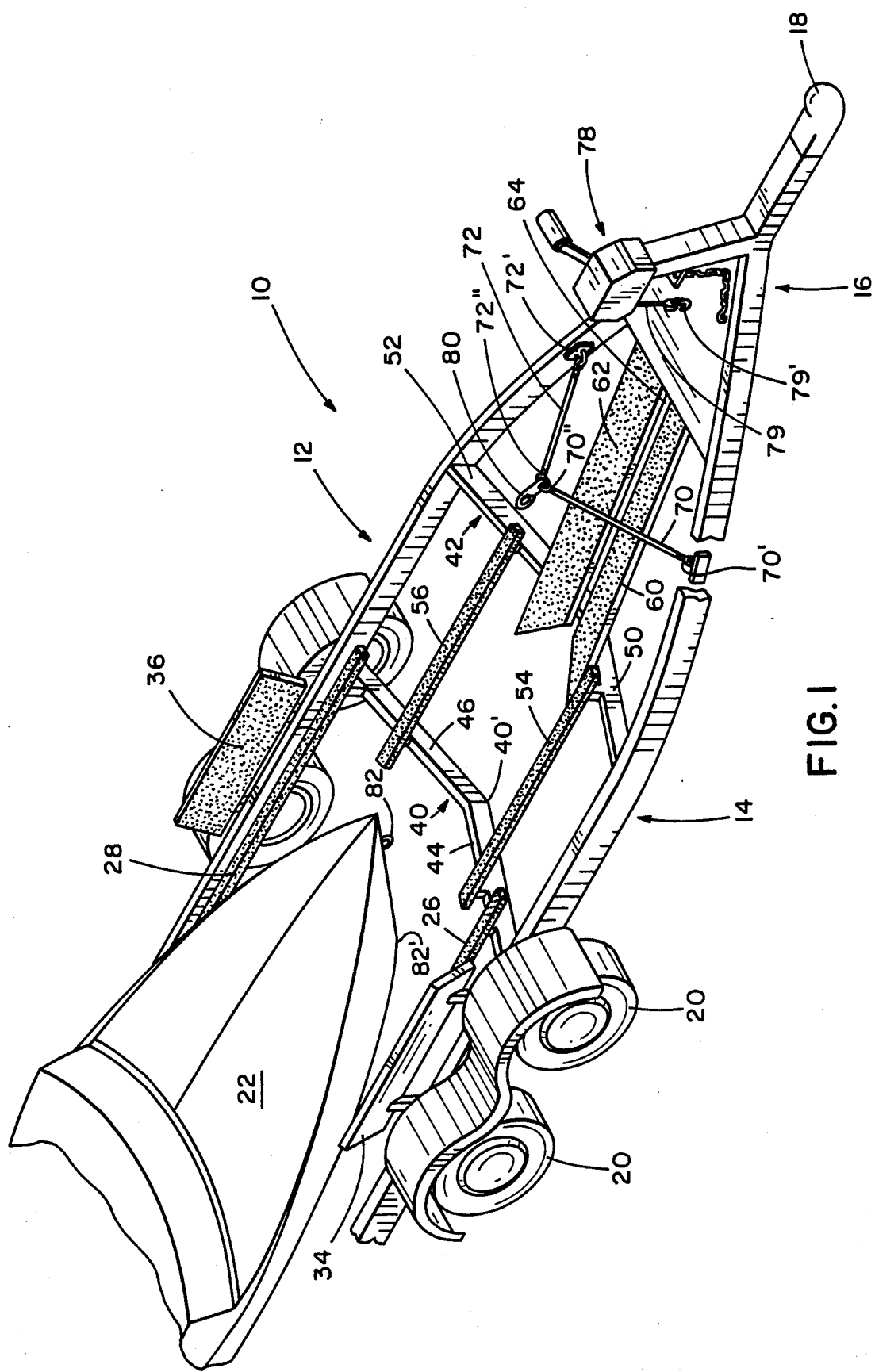
FIG. 1 is a perspective view of the improved semi-submersible boat trailer of the present invention, showing the initial stages of positioning a boat thereon.

Referring now to the drawings in greater detail, the improved semi-submersible boat-carrying trailer of the invention is indicated generally by reference numeral 10 in FIG. 1. The trailer 10 includes a main trailer frame 12 defining a substantially main body portion 14 upon which most of the length of the boat to be carried and transported will rest, and also defining a front or forward section 16 defining at its forwardmost end a trailer hitch section 18 for connection to the rear of a tow vehicle in a conventional manner.

The trailer frame 12 is conventionally provided with a set of wheels 20 by which the trailer and boat thereon are transported. The trailer frame 12 also includes support structure for supporting the boat 22, which support structures include a pair of spaced-apart, rearwardly-positioned and extending boat support-bunks or support-boards 26, 28, which, in the preferred embodiment, comprise carpeted wooden boards. These bunks or boards 26, 28 are spaced relatively close to the trailer frame proper, as is clearly shown in FIG. 1, in order to accommodate the rearward portion of the boat, which is wider than the forward bow of the boat. These bunks protect the boat from the trailer frame, and, depending upon the shape and size of the boat, may aid in the guidance or positioning of the boat in a lateral direction on the trailer, as it is loaded onto the trailer frame. This guidance-assistance depends on the contour of the boat hull, and if there are some chines in the hull, these support bunks take advantage thereof by supporting the boat therealong.

The rearward half of the trailer frame 12 is also provided with a pair of side guide-bunks or carpeted boards 34, 36, each of which extends angularly upwardly and diverging from the other thereof, as clearly shown in FIG. 1, which side guide bunks or boards guide the boat into position laterally on the trailer frame, and contact the boat along the lower portion of the sides of the boat. These side guide-bunks or boards are located over the fenders or at the rear of the trailer, depending upon the application, as well as cosmetic considerations. According to the preferred embodiment of the invention, each of the side guide-bunks 34, 36 is between 3 and 4 feet in length and is positioned laterally outwardly of the respective elongated support bunk 26, 28, as clearly shown in FIG. 1. Thus, the rearward half of the trailer supports the rearward portion of the boat, such that the elongated support-bunks or boards 26 and 28 support and contact the lower or bottom of the boat, especially when there are chines on the boat, whereas the side guide-bunks or boards 34, 36 contact and laterally guide and support the upwardly and outwardly sloping side walls of the boat's hull. The elongated guide bunks 26, 28, as well as the side guide bunks 34, 36 not only support but aid in the positioning of the boat on the trailer as the boat 22 is driven onto the trailer 10. The trailer frame 12 is provided with a plurality of cross-supports or struts, indicated generally by reference numerals 40, 42 in FIG. 1. These cross-supports 40, 42 are defined by a pair of downwardly-sloping, converging cross-beams 44, 46 and 50, 52 respectively. Each of these cross-supports 40, 42 thereby define a lower apex of a V-shaped configuration 40', 42', which is positioned generally below the horizontal plane containing therein the lower horizontal surfaces of the trailer frame 12 proper. In the preferred embodiment, each of the individual cross-struts or bar-members 44, 46, 50, 52 has a slope defined as an acute angle of approximately 73 degrees with respect to the vertical. The cross-struts or bar-members 44, 46, respectively support the forward end of a respective one of the elongated boat support-bunks 26, 28, as clearly shown in FIG. 1. In the preferred embodiment, the elongated boat support-bunks 26, 28 are spaced apart in the horizontal direction by approximately 4¼ feet, as defined between the facing or interior surfaces thereof. This compares in the preferred embodiment of a width of a trailer, as defined between the interior or inward facing surfaces thereof, of a distance of approximately 67 inches. The middle or somewhat forward portion of the trailer frame is also provided with a more closely-spaced together pair of elongated boat support-bunks or boards 54, 56, as clearly shown in FIG. 1. These boards 54, 56 are also carpeted boards, and are also used in supporting the bottom of the boat on the trailer proper, and each of these elongated side bunks 54, 56 is supported at its end between a respective one of the cross braces 44, 46 and 50, 52, as clearly shown in FIG. 1. The horizontal space between the guide support bunks 54 and 56 is less than that between the guide bunks 26 and 28. In the preferred embodiment, the horizontal space between the guide bunks 54, 56 is approximately 30½ inches, as defined between the inward or interior facing side surfaces thereof. Each of the guide bunks 54, 56 is supported on a more centrally-located portion of the respective cross-beams 44, 46, 50, 52, such that the upper or top supporting surfaces of the guide bunks 54, 56 are positioned at a vertical level below the upper or top surface of the guide bunks 26, 28 in order to accommodate the substantial V-shape or sloping outer side surfaces of the boat hull.

The trailer frame of the invention also includes a pair of forward, upwardly-sloping, tilted bow guide-support bunks 60, 62, which are spaced apart to define a horizontal gap 64 therebetween, in which is situated the central longitudinal edge of the bow of the boat's hull. Each of the guide-bunks 60, 62 is preferably carpeted board, and spaced apart to define a gap 62 of approximately 2 inches. Each of the rear ends of the guide-bunks 60, 62 is supported directly on a respective cross-beam 50, 52, as shown in FIG. 1, so that each of the guide-bunks 60, 62 is tilted to define the same angle of boat hull. These guide bunks 60, 62 converge downwardly toward each other, and are used for guiding and supporting a forward portion of the bow of the boat's hull. Both of these boards 60, 62 are also upwardly sloping from rearward towards the front, which upward angle of slope in the preferred embodiment is between 15 and 25 degrees. These bunks 60, 62 actually support the forward portion of the boat's hull, and are intrinsically used in the automatic centering procedure according to the invention. This automatic centering process is achieved via a pair of centering cables 70, 72, each of these cables having an outer or laterally-outward end 70', 72', respectively, that is fixedly secured to a forward portion of the interior side surface of the frame, as clearly shown in FIG. 1. Each of the cables 70, 72 also defines an inner end 70'', 72'' fixedly connected together via a snap-hook device 80, which is used for connection to the eye 82 of the bow of the boat 22, as shown in FIG. 1. Each of the cables 70, 72 is of the same length, and, in the preferred embodiment, each centering cable 70, 72 is 42 inches long. These two centering cables 70, 72 have the characteristic of always defining a center thereof at the connection with the snap-hook 80. That is to say, the snap-hook 80 is always positioned substantially centrally of the trailer frame, and is joined with the interior end 70'', 72'', which snap-hook is vertically aligned with the horizontal gap 64 defined between the forward walk bunks 60, 62.

Figure 2:
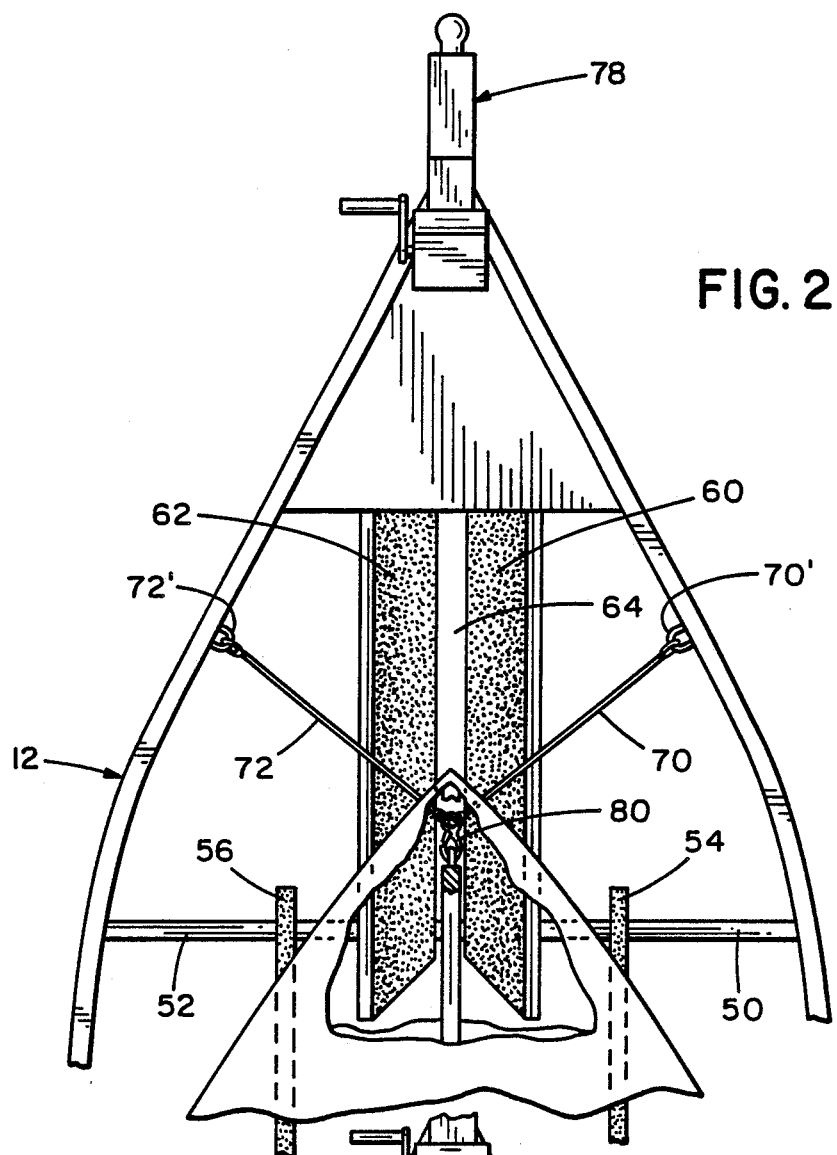
FIG. 2 is a top view thereof, showing the positioning of a boat thereon during the initial centering process with the cable harness secured to the bow-eye of the boat's bow.
Figure 3:
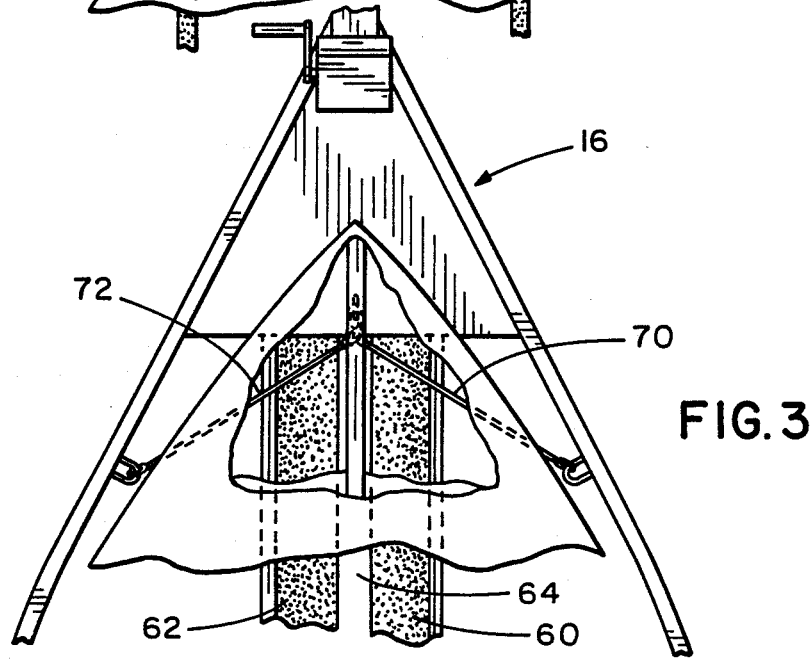
FIG. 3 is a top view similar to FIG. 2, showing the final and completed centering of the boat on the trailer, via the automatically centering cable harness of the invention.

In loading the boat 22 onto the trailer 10, the trailer is semi-submersed in the water by backing it up by the tow vehicle until the rearward portion of the trailer 14 is submersed in water, and, thereafter, propelling the boat under its own power onto the submersed portion 14 of the trailer. As the boat forces itself onto the rear of the trailer 14, it is first supported and guided via the elongated guide-bunks 26, 28 and the side bunks 34, 36, to be laterally centrally positioned thereof. Further powering of the boat 22 will cause the forward portions of the boat to be supported by the elongated guide-bunks 54, 56, until the forward portion or bow of the hull is positioned over the forward guide-bunks 60, 62. At this juncture, the snap-hook 80 is manually coupled to the eye 82 of the bow, in the manner shown in FIG. 2. At this juncture, the boat will further propel itself forwardly, which will cause the bow of the boat upwardly along the forward guide-bunks 60, 62, with the boat being automatically centered thereby, such that the crest 82' of the boat will be positioned in the gap 64 between the guide-bunks 60, 62, since any lateral movement of the boat will be offset by one of the centering cables 70, 72. For example, if the boat 22 were to veer to the right when viewing FIG. 2, the cable 72 will pull the bow of the boat in the leftward direction when viewing FIG. 2, via its connection with the eye 82 via the snap hook 80. This is evidently so because the snap-hook 80 can take no other position other than centrally of the trailer along a relatively horizontal path, directly in vertical alignment with the gap 64, between the guide bunks 60, 62. Thus, the forward portion or bow of the boat is automatically centered as the boat is self-propelled onto the trailer, with no further action or maneuvering required, in contradistinction to the prior art techniques. Finally, the boat is centered on the trailer, as shown in FIG. 3, with the hook and cables 70, 72 positioned beneath the bow of the boat, as clearly shown in FIG. 3. The position shown in FIG. 3 constitutes the forwardmost limit movement of the boat on the trailer, which is defined by the positioning of the snap hook 80 in its forwardmost direction, which is brought about by the self-propelled movement of the boat in the forward direction. In actuality, the snap-hook has a slight range of lateral movement, during the loading process, all of which are within the width of the gap 64 between the boards 60, 62, which lateral leeway is defined by the length of the cords 70, 72, which define a radius of a circle about which this snap-hook 80 may be theoretically rotated. Thus, it has been found that the 2 inch width of the gap 64 is ideal when the length of the centering cables 70, 72 are 42 inches. That is to say, imagining the automatically centering cable 70 defining a radius of a circle, the center thereof being defined by the fixed connection 70' which a trailer frame, such a cable will define a circle of radius of 42 inches. Such a circle of radius of 42 inches will define a segment on a cord, the centermost width thereof defined by a perpendicular line extending from the center of the cord of the segment, having a length of less than the 2 inches of the gap 64, especially because each of the centering cables 70, 72 also extend vertically upwardly, thereby limiting the effective radius of a horizontal circle to less than 42 inches.

The forward portion of the trailer 10 is also provided with a conventional winch 78 having a chain 79 to which is attached a hook 79' for securement to the bow-eye 82 for holding the boat fast in place on the trailer during transport in a conventional manner.

While a specific embodiment of the invention has been shown and described, it is to be understood that numerous changes and modifications thereof may be made without departing from the scope spirit and intent of the invention, as set out in the appended claims.

What is claimed is:

1. In a trailer for transporting a boat, said trailer comprising a main frame, said main frame comprising a forward portion upon which the bow of a boat is loaded, and a rearward portion, and wheels for rollingly supporting said main frame, the improvement comprising:

means for automatically centering the bow of a boat during the loading of the boat on said main frame mounted by said forward portion of said main frame;

said means for automatically centering comprising a first and a second elongated centering means each of the same length and each having a first end fixedly secured to a respective part of said forward portion of said main frame, and a second end;

said respective part of said forward portion to which is connected said first end of said first centering means being laterally opposite to said respective part of said forward portion to which is connected said first end of said second centering means;

said means for automatically centering further comprising attaching means for releasable securement to the bow eye of the hull of a boat to be loaded on said main frame, said attaching means coupling together said second ends of said first and second centering means; whereby, upon connection of said attaching means to the bow eye of a boat, said means for automatically centering centers the hull of the boat along the longitudinal center of said main frame via said first and second centering means.

2. The improvement according to claim 1, wherein each of said first and second centering means comprises a cable; said means for automatically centering further comprising a first means for swingingly mounting said first end of said first centering means to the respective said part of said forward portion, and a second means for swingingly mounting said first end of said second centering means to the respective said part of said forward portion, whereby said attaching means is translatable in a path in the fore-and-aft direction along said longitudinal axis of said main frame during loading of a boat to automatically center the boat.

3. The improvement according to claim 1, wherein said attaching means comprises a hook means for selective coupling and decoupling to an eye of a bow of a boat to be loaded.

4. The improvement according to claim 2, wherein said attaching means comprises a hook means for selective coupling and decoupling to an eye of a bow of a boat to be loaded.

5. The improvement according to claim 4, in combination with a boat to be loaded on said main frame, said boat comprising a hull and bow, said bow having a forward-facing eye for receiving said hook means for coupling said means for automatically centering to said boat.

6. The improvement according to claim 1, wherein said forward portion of said main frame comprises a first and a second elongated support means slanting upwardly from rear toward front of said main frame upon which the forward portion of the hull of a boat to be loaded is supported; said first and second support means being spaced apart in the lateral, width-wise direction to define a gap therebetween defining the approximate longitudinal center of said main frame relative to which said means for automatically centering centers a boat during loading.

7. The improvement according to claim 5, wherein said forward portion of said main frame comprises a first and a second elongated support means slanting upwardly from rear toward front of said main frame upon which the forward portion of the hull of a boat to be loaded is supported; said first and second support means being spaced apart in the lateral, width-wise direction to define a gap therebetween defining the the approximate longitudinal center of said main frame relative to which said means for automatically centering centers a boat during loading.

8. The improvement according to claim 6, wherein each of said first and second support means also slopes laterally inwardly and downwardly in the direction from exterior to interior of said main frame in order to be better contoured to the shape of the hull of a boat.

9. The improvement according to claim 7, wherein each of said first and second support means also slopes laterally inwardly and downwardly in the direction from exterior to interior of said main frame in order to be better contoured to the shape of the hull of a boat.

10. The improvement according to claim 9, wherein each of said first and second support means comprises a carpeted bunk.

11. The improvement according to claim 7, wherein said path in which said hook means is translatable above and in vertical alignment with said gap.

12. The improvement according to claim 1, wherein said main frame further comprises elongated bunk means in said rearward portion of said main frame for supporting the hull of a boat.

13. The improvement according to claim 12, wherein said bunk means comprises a first pair of laterally spaced-apart elongated supports, and a second more forwardly positioned pair of laterally spaced-apart elongated supports, said first pair of supports being laterally spaced apart more than said second pair; said main frame further comprising cross-brace means for mounting said first and second pair of elongated supports.

14. The improvement according to claim 1, further comprising winch means supported by said forward portion of said main frame for providing additional restraint to a loaded boat.

15. A method of automatically centering a boat on a trailer, where the trailer comprises a main frame, said main frame comprising a forward portion upon which the bow of a boat is loaded, and a rearward portion, means for automatically centering the bow of a boat during the loading of the boat on said main frame mounted by said forward portion of said main frame comprising a first and a second elongated centering cable each of the same length and each having a first and fixedly secured to a respective part of said forward portion of said main frame, and a second end; said means for automatically centering further comprising attaching means for releasable securement to the bow eye of the hull of a boat to be loaded on said main frame, said attaching means coupling together said second ends of said first and second centering means, said method comprising:

(a) submersing at least a part of the rearward portion of the main frame in the water;

(b) driving the boat to be loaded onto the submersed part of the trailer under the boat's own power at least until the attaching means of the means for automatically centering is capable of coupling with the bow eye of the boat being driven;

(c) coupling the attaching means to the bow eye of the boat;

(d) continuing to drive the boat under its own power in the forward direction so as to position the front of the boat in a more forward portion of the main frame;

(e) said step (d) inherently comprising moving the attaching means therealong in the forward direction via its connection with the bow eye of the boat being driven, and inherently laterally centering the boat along the longitudinal center of the main frame of the trailer via the connection between the bow eye and the attaching means.

16. The method according to claim 15, wherein said forward portion of said main frame further comprises a first and a second elongated support means slanting upwardly from rear toward front of said main frame upon which the forward portion of the hull of a boat to be loaded is supported; said first and second support means being spaced apart in the lateral, width-wise direction to define a gap therebetween defining the approximate longitudinal center of said main frame relative to which said means for automatically centering centers a boat during loading; said step (d) inherently comprising translating the attaching means of the means for automatically centering above and in alignment with the gap between the first and second support means for centering the boat along the gap.

17. The method according to claim 15, wherein said step (d) comprises driving the boat until the attaching means has traveled to the forwardmost point thereof allowed by said first and second centering cables.

18. The method according to claim 16, wherein said step (d) comprises driving the boat until the attaching means has traveled to the forwardmost point thereof allowed by said first and second centering cables.

* * * * *